United States Patent [19]

Gimpel et al.

[11] 4,399,256

[45] Aug. 16, 1983

[54] SURFACE-COATING BINDERS CONTAINING BLOCKED ISOCYANATE GROUPS, AND THEIR USE IN CATHODIC ELECTROCOATING

[75] Inventors: Jürgen Gimpel; Karl-Heinz Feuerherd, both of Ludwigshafen; Hans-Uwe Schenck, Wachenheim, all of Fed. Rep. of Germany

[73] Assignee: BASF Aktiengesellschaft, Fed. Rep. of Germany

[21] Appl. No.: 251,919

[22] Filed: Apr. 7, 1981

[30] Foreign Application Priority Data

May 8, 1980 [DE] Fed. Rep. of Germany ....... 3017603

[51] Int. Cl.$^3$ ............................................. C08L 63/00
[52] U.S. Cl. ................................... 525/111; 523/406; 525/528
[58] Field of Search ............................... 525/111, 528; 260/29.6 NR; 523/406

[56] References Cited

U.S. PATENT DOCUMENTS

| | | | |
|---|---|---|---|
| 3,692,746 | 9/1972 | Woo | 260/77.5 |
| 3,883,483 | 5/1975 | Anderson | 260/77.5 |
| 3,930,051 | 2/1976 | Anderson | 204/181 |
| 3,976,615 | 8/1976 | Sekmakas | 204/181 |
| 4,009,133 | 2/1977 | Jones | 525/528 |
| 4,085,161 | 4/1978 | Sekmakas | 525/528 |
| 4,150,211 | 4/1979 | Muller | 525/528 |
| 4,260,716 | 4/1981 | Christenson | 525/528 |

OTHER PUBLICATIONS

Houben-Weyl; "Methoden der organischen Chemie", vol. 14/2 (1963), pp. 61-70.
W. Machu: "Elektrotauchlackierung", (1974), pp. 155-179.

*Primary Examiner*—Paul Lieberman
*Attorney, Agent, or Firm*—Keil & Witherspoon

[57] ABSTRACT

Surface-coating binders based on a copolymer which contains tertiary amino groups, blocked isocyanate groups, hydroxyl groups and ether groups and which, due to partial or complete salification with an acid, is water-soluble or water-dispersible.

This copolymer contains, as copolymerized units, one or more olefinically unsaturated compounds possessing a tertiary amino group, an N-(1-alkenyl) isocyanate blocked with a CH—, OH— or NH-acidic blocking agent, an adduct of an epoxy resin based on bisphenol A and epichlorohydrin, and having a molecular weight of from 380 to 3,500, with an olefinically unsaturated alcohol of 3 to 20 carbon atoms, and one or more other copolymerizable olefinically unsaturated compounds, and has a mean molecular weight of from 1,000 to 20,000.

The novel surface-coating binder is used for the cathodic electrocoating of metallic articles.

7 Claims, No Drawings

SURFACE-COATING BINDERS CONTAINING BLOCKED ISOCYANATE GROUPS, AND THEIR USE IN CATHODIC ELECTROCOATING

The present invention relates to surface-coating binders based on a copolymer containing tertiary amino groups, blocked isocyanate groups, hydroxyl groups and ether groups, and their use in electrocoating finishes.

The use, in electrocoating, of binders consisting of acrylate resins crosslinked by isocyanates has been disclosed. For example, U.S. Pat. No. 3,883,483 discloses a polymer composition for cathodic electrocoating, which contains the reaction product of a diisocyanate, having one blocked isocyanate group, with an ethylenically unsaturated hydroxyl compound, such as hydroxyethyl acrylate. However, as a result the isocyanate group required for crosslinking is bonded to the polymer carbon chain by an ester bond. A proportion of the ester bonds is cleaved by hydrolysis as the electrocoating bath ages. Consequently, the composition of the components required for crosslinking changes as the bath ages, leading to poorer chemical resistance, and poorer anti-corrosion properties, of the coatings produced.

U.S. Pat. No. 3,976,615 describes electrocoating binders based on polyethers which contain from 1.2 to 2 unsaturated ether groups per molecule and which are copolymerized with unsaturated monomers containing amino groups, for example dimethylaminoethyl methacrylate. N-Alkoxymethyl-acrylamides and -methacrylamides, phenoplasts and aminoplasts are mentioned as crosslinking agents. These agents however make the electrocoating baths very voltage-sensitive. If the crosslinking agent is dispensed with, the resistance to chemicals and the mechanical properties of the finishes are no longer satisfactory.

German Patent Application No. P 29 24 756.1 proposes electrocoating binders which contain a blocked vinyl isocyanate as a comonomer. However, the anti-corrosion properties of these finishes are not fully satisfactory.

It is an object of the present invention to provide surface-coating binders, especially for electrocoating finishes, which give coatings having good anti-corrosion properties. For effecting the crosslinking reaction, the binders should contain a defined amount of blocked isocyanate groups directly bonded to the carbon chain of the polymer. The polymer molecule may or may not contain other reactive groups, so that the polymers may be employed as self-crosslinking binders or as binders which need an external crosslinking agent.

We have found that this object is achieved, surprisingly, by providing polymers which in addition to blocked N-(1-alkenyl) isocyanates contain adducts of olefinically unsaturated alcohols with epoxy resins based on bisphenol A/epichlorohydrin as copolymerized units and that these polymers can be prepared in spite of the low polymerization temperatures which the blocked N-(1-alkenyl) isocyanate monomers demand.

The present invention relates to a surface-coating binder based on a copolymer which contains tertiary amino groups, blocked isocyanate groups, hydroxyl groups and ether groups and which, due to partial or complete salification with an acid, is water-soluble or water-dispersible, and wherein the copolymer contains, as copolymerized units, (A) from 6 to 22% by weight of one or more olefinically unsaturated compounds containing a tertiary amino group, (B) from 10 to 35% by weight of an N-(1-alkenyl) isocyanate blocked with a CH—, OH— or NH-acidic blocking agent, (C) from 20 to 50% by weight of an adduct of an epoxy resin, based on bisphenol A and epichlorohydrin and having a molecular weight of from 380 to 3,500, with an olefinically unsaturated alcohol of 3 to 20 carbon atoms, (D) from 10 to 64% by weight of one or more copolymerizable olefinically unsaturated compounds not already mentioned under (A) to (C), with the proviso that the copolymer has a mean molecular weight of from 1,000 to 20,000 and that the sum of the percentages of (A) to (D) is 100.

The present invention further relates to the use of these surface-coating binders for the cathodic electrocoating of metallic articles, the novel binders being used either as self-crosslinking binders or in combination with polyfunctional crosslinking agents as externally crosslinking binders.

The novel surface-coating binders conform to the requirements stated above and in particular exhibit substantial improvements in respect to the anti-corrosion properties and chemical resistance of the coatings obtained.

The electrocoating finish produced from the binder according to the invention in general contains from 7 to 20% by weight of the protonized copolymer.

The following details are to be noted regarding the constituents of the novel binder:

(A) Suitable components (A) are conventional ethylenically unsaturated compounds having a tertiary amino group, for example dialkylaminoalkyl acrylates and methacrylates, where alkyl is of 1 to 8, preferably of 1 to 4, carbon atoms, such as tertiary aminoalkyl acrylates and methacrylates, eg. N,N-dimethylaminoethyl methacrylate or N,N-diethylaminoethyl acrylate, or tertiary aminoalkyl acrylamides and methacrylamides, eg. N,N-dimethylaminopropyl acrylamide and methacrylamide, and N,N-diethylaminopropyl acrylamide and methacrylamide.

The novel binders contain from 6 to 22, preferably from 6 to 15, % by weight of component (A) as copolymerized units. The presence of from 6 to 10% by weight of the said aminoalkyl acrylamides or methacrylamides is particularly preferred.

(B) Component (B) is an adduct of an N-(1-alkenyl) isocyanate and a CH—, OH— or NH-acidic blocking agent. Suitable N-(1-alkenyl) isocyanates are those where alkenyl is of 2 to 4 carbon atoms, preferably vinyl isocyanate and/or propenyl isocyanate. Examples of suitable blocking agents for the preparation of component (B) are monophenols, eg. phenol, cresol and trimethylphenol, primary or secondary alcohols, eg. isopropanol and cyclohexanol, tertiary alcohols, eg. t-butanol and t-amyl alcohol, easily enolizable compounds, eg. ethyl acetoacetate, acetylacetone, malonic acid derivatives, eg. diesters of malonic acid with alcohols of 1 to 8 carbon atoms, malonodinitrile, secondary aromatic amines, eg. N-methylaniline, N-methyltoluidine and N-phenyltoluidine, imides, eg. succinimide and phthalimide, lactams, eg. ε-caprolactam, δ-valerolactam and lauryllactam, oximes, eg. acetone-oxime, butanone-oxime and cyclohexanone-oxime, and aromatic triazoles, eg. triazabenzene. Particularly preferred blocking agents of the N-(1-alkenyl) isocyanates are t-butanol, cyclohexanol, δ-caprolactam, methyl ethyl ketone-oxime and triazabenzene.

The blocked N-(1-alkenyl)isocyanate, eg. the blocked vinyl isocyanate, can be prepared, for example, by a method similar to that given in Houben-Weyl, Methoden der organischen Chemie, volume 14/2 (1963), 61–70. Preferably, the preparation is carried out in the presence of a solvent. The reaction of the N-(1-alkenyl)isocyanate (vinyl isocyanate) with the blocking agent is carried out with about equimolar amounts. An excess of isocyanate is to be avoided, since it might subsequently cause crosslinking.

The novel copolymer contains from 10 to 35, preferably from 15 to 25, % by weight of component (B) as copolymerized units.

(C) Component (C) is a reaction product of an epoxy resin of bisphenol A and epichlorohydrin, having a molecular weight of from 380 to 3,500 and preferably containing about 2 epoxide groups per molecule, with an olefinically unsaturated alcohol of 3 to 20 carbon atoms, for example allyl alcohol, geraniol, but-1-en-3ol, farnesol, soybean alcohol, linseed oil alcohol or with a hydroxyalkyl allyl ether and alkanol allyl thioether of 2 to 6 carbon atoms in the alkanol radical, eg. allyl hydroxypropyl ether and allyl hydroxyethyl thioether, the reaction product of the epoxy resin with the unsaturated alcohol being preferably free from epoxide groups. The preferred molecular weight of the epoxy resin, before reaction with the alcohol, is from 380 to 1,400. A particularly preferred substance is the reaction product of such an epoxy resin, having a mean molecular weight of about 900, with allyl alcohol or but-1-en-3-ol.

The novel copolymer contains from 20 to 50, preferably from 25 to 50, % by weight of component (C) as copolymerized units.

(D) Suitable components (D) are copolymerizable olefinically unsaturated compounds not already mentioned under (A) to (C), such as esters of acrylic acid or methacrylic acid with monoalcohols of 1 to 18, preferably of 1 to 8, carbon atoms, eg. methyl acrylate, ethyl acrylate, butyl acrylate, ethylhexyl acrylate and methyl methacrylate. Any other copolymerizable unsaturated compounds may also be used, especially vinyl esters of carboxylic acids of 2 to 10 carbon atoms, eg. vinyl acetate, vinyl propionate and vinyl pivalate, vinyl-aromatics, eg. styrene, acrylonitrile and olefinically unsaturated triglycerides, eg. isomerized linseed oil, as well as mixtures of the said monomers.

The novel copolymer contains from 10 to 64, preferably from 15 to 60, % by weight of component (D) as copolymerized units.

Advantageously, the novel copolymers are prepared in polar solvents devoid of OH groups, such as ethers, eg. tetrahydrofuran, esters, eg. ethyl acetate or n-butyl acetate, aromatic hydrocarbons, eg. xylene or toluene, or mixtures of these solvents, in the presence of free radical initiators, eg. azo-bis-carboxamides, azo-bis-carboxylic acid nitriles, or peroxides, in general at from 50° to 120° C., preferably from 60° to 90° C., in the presence or absence of a regulator, eg. t-dodecylmercaptan or diisopropylxanthogen disulfide. Examples of particularly preferred binders are copolymers of from 6 to 12% by weight of N,N-dimethylaminopropylmethacrylamide, from 20 to 25% by weight of vinyl isocyanate blocked with caprolactam or methyl ethyl ketone-oxime, from 25 to 50% by weight of a reaction product of an epoxy resin, obtained from bisphenol A and epichlorohydrin and having a mean molecular weight of 900, with allyl alcohol, and from 13 to 49% by weight of component (D), eg. butyl acrylate or 2-ethylhexyl acrylate.

An equivalence ratio of the reactive hydrogens of component (C) to the blocked isocyanate groups of component (B) of about 1:1 is preferred.

The novel copolymers are non-crosslinked products having a molecular weight of from 1,000 to 20,000, preferably from 2,000 to 10,000 (measured by a vapor pressure osmometer). The K values (determined by the Fikentscher method on a 3% strength solution in acetone) are correspondingly from 15 to 35, preferably from 18 to 24.

The novel copolymers contain tertiary amino groups, blocked isocyanate groups and structures which are reactive toward isocyanate groups, and may or may not contain carbon-carbon double bonds, which on baking the surface coatings contribute to the crosslinking.

According to the invention, these copolymers are used as surface-coating binders and are water-soluble or water-dispersible through partial or complete salification with acids.

For such salification, the copolymers are partially or completely neutralized with an acid; the latter may be inorganic or organic, acetic acid, lactic acid and gluconic acid being preferred. The degree of neutralization required for use of the novel surface-coating binders in an aqueous medium is in general from 10 to 100%.

In addition to the novel binder, the surface-coating composition can contain polyfunctional crosslinking agents, such as hydroxyl-containing polymers, polyesters, polyadducts or polycondensates, eg. aminoplasts or phenol-formaldehyde resins, as well as pigments, eg. titanium dioxide, talc and carbon black, in amounts which, depending on the application, are from 10 to 60, preferably from 20 to 50, parts by weight per 100 parts by weight of binder. Furthermore, it may contain inorganic and organic colored pigments in amounts of up to 5 parts by weight and fillers, again in amounts of up to 5 parts by weight. Furthermore, up to 10 parts of a leveling agent, up to 10 parts of a wax to increase the scratch resistance, and up to 2 parts of a catalyst for the unblocking reaction, eg. dibutyl-tin dilaurate, may be present per 100 parts of binder.

The novel surface-coating binders are used in particular for cathodic electrocoating, either as self-crosslinking binders or as binders requiring an external crosslinking agent.

The novel electrocoating finishes may in particular be used to coat metallic articles, for example consisting of iron, steel or aluminum.

The cationic electrocoating baths are prepared in a conventional manner, for example as described in W. Machu, Elektrotauchlackierung (1974), 155 et seq. The solids content of the electrocoating baths is in general from 7 to 15% by weight and the pH from 4.0 to 7.5.

The coatings obtained using the novel binder are very hard, very resilient and resistant to chemicals, and provide good protection from corrosion. Aging of the bath does not have an adverse effect on the said good properties.

In the Examples which follow, parts and percentages are by weight, unless stated otherwise. Preparation of component (B)

(B1) tert.-Butyl N-vinylcarbamate 69 parts of vinyl isocyanate and 70 parts of ethyl acetate are introduced into a reaction vessel equipped with a high-efficiency condenser (employing cooling brine), stirrer, thermometer and feed vessel. 74 parts of tert.-butanol, 73 parts of ethyl acetate and 0.01% of dibutyl-tin dilaurate are added in the course of 1 hour at 40° C. The reaction is then allowed to continue for 10 hours at 40° C. A pale yellow clear solution results. Blocked isocyanate content: 14.7%.

(B2) Cyclohexyl N-vinylcarbamate 69 parts of vinyl isocyanate and 89.5 parts of ethyl acetate are introduced into a reaction vessel and heated to 40° C. A mixture of 110 parts of cyclohexanol and 89.5 parts of ethyl acetate (containing 0.02% of dibutyl-tin dilaurate as catalyst) is added in the course of 1 hour. The mixture is then allowed to react for 2 hours at 40° C. A pale yellow solution is obtained, from which the reaction product crystallizes out on cooling. Blocked isocyanate content: 11.7%.

(B3) Vinyl isocyanate/ε-caprolactam adduct 113 parts of ε-caprolactam and 91 parts of ethyl acetate (+0.015% of dibutyl-tin dilaurate) are introduced into a reaction vessel and the mixture is heated to about 50° C. A mixture of 69 parts of vinyl isocyanate and 91 parts of ethyl acetate is then added dropwise in the course of 1 hour, after which the mixture is allowed to react for 5 hours. A pale yellow clear solution is obtained. Blocked isocyanate content: 11.5%.

Preparation of component (C)

250 parts of an epoxy resin obtained from bisphenol A and epichlorohydrin and having a mean molecular weight of 900 and an epoxide value of 0.2–0.223, and 400 parts of allyl alcohol, are mixed and heated at 80° C. until a homogeneous solution has formed.

1.75 parts of boron trifluoride diethyl etherate solution, 75 parts of allyl alcohol and 0.1 part of hydroquinone monomethyl ether are added. After refluxing for 2 hours, the excess alcohol is distilled off and the product is taken up in ethyl acetate. A clear yellowish solution having an epoxide value of 0.00 and a solids content of 61% is obtained.

Preparation of the copolymer solutions

Polymer 1

12 parts of ethyl acetate and 20% of the feed mixture are initially introduced into a reaction vessel equipped with a stirrer, reflux condenser and internal thermometer. The feed mixture consists of 50 parts of component C, 20 parts of acrylonitrile, 70 parts of ethylhexyl acrylate, 40 parts of adduct B 3, 20 parts of N,N-dimethylaminopropyl methacrylamide, 6 parts of t-dodecylmercaptan and 4 parts of 2,2'-azo-bis-(2,4-dimethylvaleronitrile). The initial charge is heated to 70° C. and the feed is added in the course of 3 hours at 70° C. Polymerization is then continued for one hour, after which 0.5% of initiator is added and the polymerization is continued until the conversion is 100%. A clear solution of a resin, having a K value of 17.7, is obtained, the solids content being 72%.

Polymer 2

A polymer is prepared as described for polymer 1, but using adduct B2 in place of adduct B3. The polymer has a K value of 17.6 and the solids content of the solution is 69.2%.

Polymer 3

50 parts of component C, 20 parts of acrylonitrile, 50 parts of ethylhexyl acrylate, 40 parts of adduct B3, 20 parts of an isomerized linseed oil and 20 parts of N,N-dimethylaminopropyl methacrylamide are copolymerized as described for polymer 1. The polymer solution has a solids content of 70.8%, and the K value of the polymer is 23.6.

Polymer 4

A polymer is prepared as described for polymer 3, but using adduct B2 in place of adduct B3. The polymer has a K value of 22.3 and the solids content of the solution is 72.4%.

Comparative Polymer 1

70 parts of component C, 20 parts of acrylonitrile, 90 parts of ethyhexyl acrylate and 20 parts of N,N-dimethylaminopropyl methacrylamide are copolymerized by the method described for polymer 1. The polymer has a K value of 17.7 and the solution has a solids content of 70.8%.

Comparative Polymer 2

29 parts of adduct B3, 25 parts of hydroxypropyl acrylate, 10 parts of styrene, 30 parts of isobutyl acrylate and 6 parts of N,N-dimethylaminopropyl methacrylamide are copolymerized by the method described for polymer 1. The polymer has a K value of 24 and the solution has a solids content of 64.5%.

Electrocoating composition 1

2.17 parts of acetic acid are added to 189 parts of polymer solution 1. A 10% strength dispersion is prepared with fully demineralized water and is used for the cathodic electrocoating of zinc-phosphatized iron sheet for a period of 2 minutes; the coating is then baked for 30 minutes at 180° C.

Electrocoating composition 2

2.2 parts of acetic acid are added to 145 parts of polymer solution 2. A 10% strength dispersion is prepared with fully demineralized water and is used for the cathodic electrocoating of zinc-phosphatized iron sheet for a period of 2 minutes; the coating is then baked for 30 minutes at 220° C.

Electrocoating composition 3

A 10% strength aqueous dispersion is prepared from 141 parts of polymer solution 3, as described for electrocoating composition 1, and is used for the cathodic coating of zinc-phosphatized iron sheets, which are then baked for 30 minutes at 180° C.

Electrocoating composition 4

An electrocoating composition is prepared from 138 parts of polymer solution 4 as described for electrocoating composition 2, and used as described there.

Electrocoating composition 5 (Comparative Example without isocyanate monomer)

An electrocoating composition is prepared from 141 parts of comparative polymer 1, as described for electrocoating composition 1.

Electrocoating composition 6 (Comparative Example without isocyanate monomer, and with phenoplast as crosslinking agent)

An electrocoating composition is prepared, as described for electrocoating composition 1, from 100 parts of comparative polymer 1 and 44 parts of a commercial bisphenol A/formaldehyde resin (solids content 68%).

Electrocoating composition 7 (Comparative Example without component C)

An electrocoating composition is prepared from 155 parts of comparative polymer 2, as described for electrocoating composition 1.

The properties of the coatings obtained with compositions 1 to 7 are shown in the Table.

TABLE

| Properties of the electrocoatings | | | | | | | |
|---|---|---|---|---|---|---|---|
| | Electrocoating composition No. | | | | | | |
| | 1 | 2 | 3 | 4 | 5 | 6 | 7 |
| Deposition voltage [V] | 300 | 350 | 350 | 300 | 300 | 60 | 200 |
| Coating thickness [μm] | 13 | 14 | 17 | 13 | 20 | 20 | 10 |
| Pendulum hardness [sec] (DIN 53,157) | 179 | 192 | 189 | 192 | 53 | 174 | 164 |
| Erichsen deep-drawing value [mm] (DIN 53,156) | 8.0 | 10 | 8.5 | 10 | 9.0 | 6.5 | 7.5 |
| Acetone resistance | i o | i o | i o | i o | n i o | n i o | i o |
| Corrosion protection (DIN 50,021) | 168 h: 5 mm | 240 h: 1 mm | 240 h: 8 mm | 240 h: 1 mm | 168 h: 12 mm | 168 h: 4 mm | 96 h: 16 mm | i o = in order
n i o = not in order

We claim:
1. A surface-coating binder based on a copolymer which contains tertiary amino groups, blocked isocyanate groups, hydroxyl groups and ether groups and which, due to partial or complete salification with an acid, is water-soluble or water-dispersible, and wherein the copolymer contains, as copolymerized units,
(A) from 6 to 22% by weight of one or more olefinically unsaturated compounds containing a tertiary amino group,
(B) from 10 to 35% by weight of vinyl isocyanate or propenyl isocyanate blocked with a CH—, OH— or NH-acidic blocking agent,
(C) from 20 to 50% by weight of an adduct of an epoxy resin, based on bisphenol A and epichlorohydrin and having a molecular weight of from 380 to 3,500, with an olefinically unsaturated alcohol of 3 to 20 carbon atoms,
(D) from 10 to 64% by weight of one or more copolymerizable olefinically unsaturated compounds not already mentioned under (A) to (C), with the proviso that the copolymer has a mean molecular weight of from 1,000 to 20,000 and that the sum of the percentages of (A) to (D) is 100.

2. A surface-coating binder as set forth in claim 1, wherein component (B) is an adduct of vinyl isocyanate or propenyl isocyanate with cyclohexanol, t-butanol, ε-caprolactam, methyl ethyl ketone-oxime or triazabenzene, in the molar ratio of isocyanate to blocking agent of 1:1.

3. A surface-coating binder as set forth in claim 1 or 2, wherein the ratio of the number of equivalents of reactive hydrogens of component (C) to the number of equivalents of blocked isocyanate groups of component (B) is about 1:1.

4. A surface-coating binder as set forth in claim 1, wherein the copolymer contains N,N-dimethylaminopropyl methacrylamide as component (A), vinyl isocyanate, blocked with ε-caprolactam or methyl ethyl ketone-oxime, as component (B), a reaction product of an epoxy resin, obtained from bisphenol A and epichlorohydrin and having a mean molecular weight of 900, with allyl alcohol, as component (C) and butyl acrylate or 2-ethylhexyl acrylate as component (D), the said components being present as copolymerized units.

5. A process for the cathodic electrocoating of metallic articles, wherein the binder used is a surface-coating binder as set forth in claim 1.

6. A process for the cathodic electrocoating of metallic articles, wherein the binder used is a mixture of the surface-coating binder as set forth in claim 1 and a polyfunctional crosslinking agent.

7. A process as set forth in claim 6, wherein the polyfunctional crosslinking agent used is a hydroxyl-containing polymer, polyester or polyadduct.

* * * * *